UNITED STATES PATENT OFFICE.

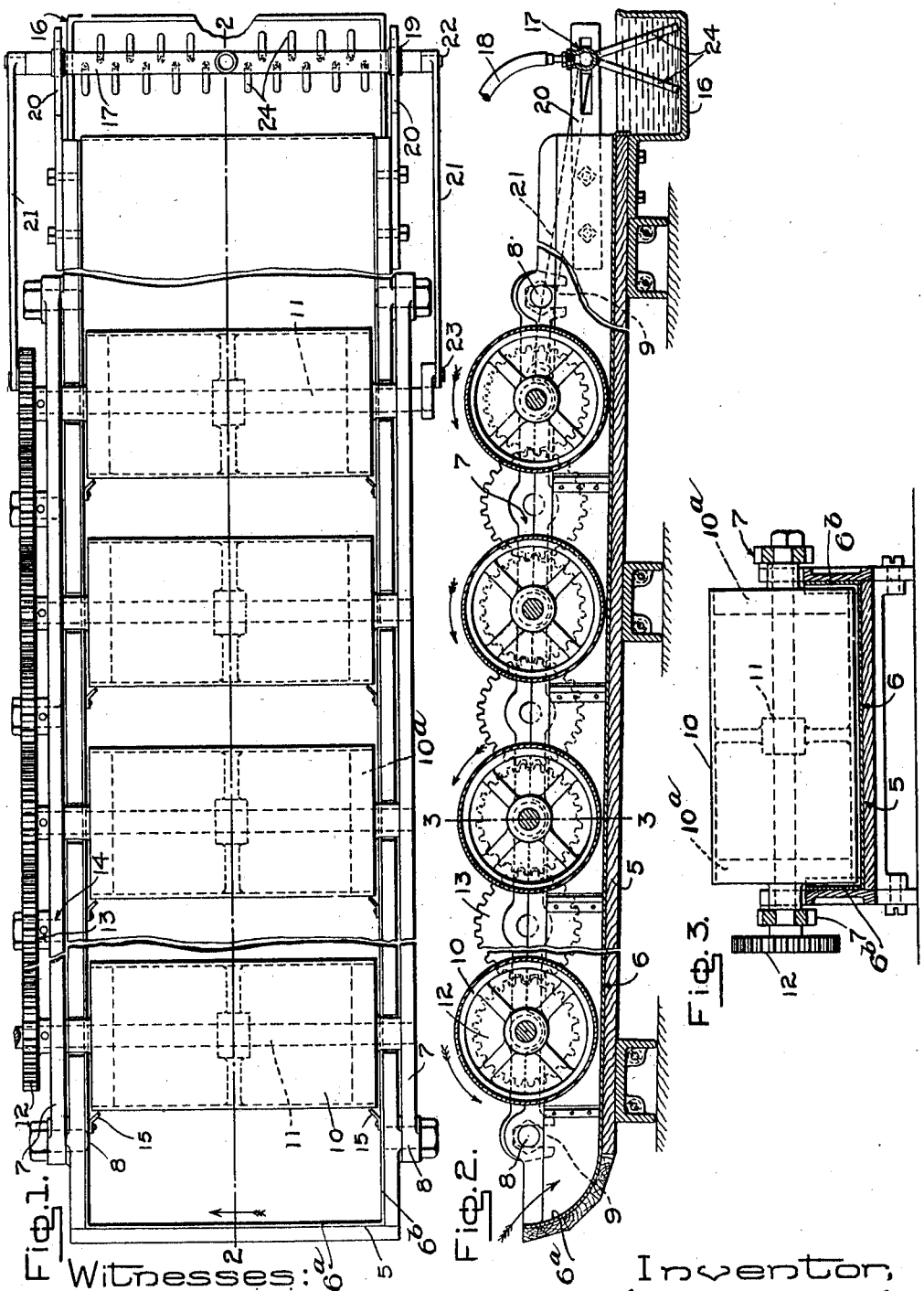

JOSEPH H. McNEIL, OF EAST SAUGUS, MASSACHUSETTS.

AMALGAMATOR.

970,536.  Specification of Letters Patent.  Patented Sept. 20, 1910.

Application filed October 20, 1909.  Serial No. 523,658.

*To all whom it may concern:*

Be it known that I, JOSEPH H. MCNEIL, a citizen of the United States, residing at East Saugus, in the county of Essex and State of Massachusetts, have invented certain new and useful Improvements in Amalgamators; and I do hereby declare the following to be a full, clear, and exact description of the invention, such as will enable others skilled in the art to which it appertains to make and use the same.

This invention relates to amalgamators and more particularly to that type of amalgamator for use in the separation of "flour" gold from the auriferous matter in which it is contained.

As its name implies, flour gold is comprised of extremely small particles of precious metal which are so light that they rise to the surface instead of sinking and, therefore, cannot be recovered by the usual gravity processes.

One object, therefore, of the invention is to provide means for recovering the flour gold which floats on the surface of the auriferous matter and water which passes through the amalgamator.

With this object in view, one feature of the invention comprises a plurality of rotary drums arranged in series within the trough or sluice forming part of the amalgamator, the surfaces of these drums being amalgamated with mercury. The drums are so arranged in the trough that their peripheral surfaces form a tangential contact with the plane of the surface of the materials passing through the trough or sluice. With such a construction, the flour gold which floats upon the surface of the materials is lightly touched by the amalgamated surfaces of the drums and is picked up thereby. The drums are rotated in the direction of flow of the materials passing through the amalgamator and preferably at the speed of flow of the materials so that there will be no disturbance of the amalgam on the surfaces of the drums which will cause it to be removed and decrease the ability of the surface to attract and separate the flour gold from the materials in the trough.

In its preferred form the amalgamator is arranged so that the drums may be adjusted toward and from the bottom of the trough or sluice so that the tangential contact between the drums and materials in the trough may be maintained no matter what the depth of the materials may be.

Of course, the auriferous matter which contains the flour gold also contains some gold which can be recovered by the gravity process and, therefore, the bottom of the amalgamator is provided with an amalgamated plate which recovers the larger particles of the precious metal. As the materials are passed through the trough with a flow of water, as is usual, the frictional contact against the amalgamated bottom plate causes some of the mercury to be washed off.

Another object of the invention is to preserve this mercury so that it can later be retorted and any gold contained therein recovered.

Another feature of the invention, therefore, comprises a trap arranged at the end of the trough or sluice which receives the gangue and any mercury which may be washed out of the trough. If, however, the gangue in this trap is not kept agitated it will pack and cake and in a short while the trap will be partially or completely filled and the flow through the trough will carry the gangue and any mercury which it may contain over the weir formed by the rear wall of the trap, thus losing the mercury.

Another object of the invention, therefore, is to provide means for maintaining the gangue in the trap agitated so that it will be prevented from caking and any mercury therein will be permitted to settle and be preserved at the bottom of the trap. In accordance with this object, a further feature of the invention comprises a water conduit in the trap having discharge nozzles extending into the gangue therein, and to a point below the surface of the mercury at the bottom of the trap. When water is discharged through these nozzles, it rises through the mercury and through the gangue with a boiling up action keeping all these materials agitated. To further insure an agitation of the gangue, the conduit is arranged for a reciprocatory movement so that the discharge nozzles act as stirrers and are thus enabled to thoroughly agitate all portions of the materials in the trap. This feature of the invention obviously is useful in all amalgamators where caking or packing of the materials at a weir is liable to occur and, except as defined in the claims, is not limited to the particular amalgamator illustrated.

In addition to the features of the invention above referred to, the invention also consists of certain constructions and arrangements of parts as fully set forth hereinafter, the advantages of which will be obvious to those skilled in the art.

To this end the invention comprises the features and combinations of parts hereinafter described and particularly pointed out in the appended claims.

The various features of the invention will be best understood from a description of the preferred embodiment thereof illustrated in the accompanying drawing, in which—

Figure 1 is a plan of the amalgamator; Fig. 2 is a longitudinal section on the line 2—2 of Fig. 1; and Fig. 3 is a transverse section on the line 3—3 of Fig. 2.

In the embodiment of the invention illustrated in the drawing, 5 is a frame preferably of wood and provided with a metallic bottom plate 6 having a curved end 6$^a$ and turned up edges 6$^b$ forming a trough or sluice within the frame 5. The inner surface of the bottom and sides of the plate 6 are amalgamated prior to passing any materials therethrough. The frame 5 is provided with outside auxiliary frames 7 which are adjustably mounted upon its sides by means of clamping bolts 8 passing through slots 9 in the auxiliary frames. These auxiliary frames support a plurality of rotary drums 10 arranged in series within the trough 5 and extending across it, the journals for the drums in the frames 7 resting on fiber in recesses formed in the sides of the frame 5. The drums 10 are rigidly secured to a series of shafts 11, the shafts passing through solid headers 10$^a$ in the ends of the drums. The headers are made watertight so that no materials can get inside of the drums. Each shaft 11 is provided at one end with a gear 12 which gears intermesh with idle gears 13 mounted on studs 14 projecting from one of the frames 7. The gears 13 and 14 are rotated by any suitable form of driving mechanism (not shown) applied to one of the drum shafts 11. The rotation of the shafts 11 is in the direction of the arrows, Fig. 2, so that the drums are caused to rotate in the direction of flow of the materials through the trough or sluice.

The peripheral surface and ends of each of the drums are amalgamated and the frames 7 are so adjusted, previous to the operation of the amalgamator, that the amalgamated surfaces of the drums form a tangential contact with the surface of the materials passing through the trough. Preferably the speed of rotation of the drums is just equal to the speed of flow of the materials through the trough. This construction permits the amalgamated surfaces of the drums to keep steadily in contact with the surface of the materials without any frictional disturbance of the mercury on the drums, thereby maintaining the amalgamated surfaces undisturbed and insuring a continued high efficiency for said surfaces.

The construction just described permits a thorough amalgamation of all the precious metals in the auriferous matter which is passed through the trough. The plate 6 will recover all the gold which is heavy enough to sink through the materials by force of gravity and the surfaces of the drums 10 will recover all the flour gold which floats upon the surface of the materials.

Inside of each side of the trough and in front of each of the drums are arranged devices 15 which deflect the materials passing through the trough from the open spaces between the ends of the drums and the sides of the trough causing all of the gold bearing materials to pass through the trough in a position to contact with the amalgamated surfaces of the drums. These deflectors 15 are preferably arranged substantially vertical and extend to the surface of the amalgamated bottom plate 6.

In order to recover any mercury which is washed off of the amalgamated surfaces of the drums or the bottom plate 6, the discharge end of the frame 5 is provided with a trap 16, the rear wall of which forms a weir at the end of the trough against which mercury and tailings are delivered. Above this trap there is provided a water conduit 17 supplied through a pipe 18 and provided with bearing blocks 19 at its ends resting in guideways formed by slots in brackets 20 projecting from the sides of the frame 5. The conduit 17 is reciprocated within its guideways by means of pitmen 21 connected at one end to studs 22 projecting from the bearing blocks 19 and at their other end to cranks 23 carried by one of the drum shafts 11. In the preferred construction a series of discharge nozzles 24 depend from the conduit 17 and project downward through the gangue in the trap 16 and substantially to the plane of the floor of the trap below the surface of any mercury which may be caught in said trap. If water is discharged on the surface of a thin layer of mercury, it will cause the mercury to flour and be washed away with the flow of water, but if water is discharged below the surface of a thin layer of mercury it will boil up through the mercury and serve to agitate it without flouring it or causing any loss. The further advantage gained by reciprocating the discharge nozzles has already been set forth.

The operation of the amalgamator is simple. The forward end of the plate 6 is placed in position to receive the materials containing the auriferous matter directly from the stamp mill with the usual flow of water which washes the materials through the trough. Those skilled in the art will understand that the depth of the materials flowing through the trough is kept slight and they are thus thoroughly distributed over the surface of the bottom plate 6 so as to permit said plate and the drums to act most effectively in recovering the gold. After the run has been completed, the drums 10 are removed from the trough by disconnecting the frames 7. The drums and the bottom plate are then scraped and the mercury obtained therefrom retorted. Also, any mercury found in the trap 16 is taken therefrom and retorted.

While the invention is shown as employing a series of drums within the trough and while preferably a series of eight are used in practice, obviously the principle of the invention may be applied to an amalgamator in which but a single drum is employed.

Nothing herein contained is to be interpreted as limiting the invention in the scope of its application to use in connection with the particular arrangement herein illustrated, for, while the particulars of construction herein set forth are well suited to one form of the invention, it is not to be understood that these particulars are essential since they may be variously modified within the skill of the artisan without departing from the true scope of the actual invention.

What is claimed as new, is:—

1. An amalgamator for " flour gold ", having, in combination a stationary trough formed with a plain surfaced bottom through which the auriferous matter is washed by a flow of water, a drum having an amalgamated surface arranged within and across the trough, the periphery of the drum being maintained slightly separated from the bottom of the trough to present its surface tangentially to the surface of the water.

2. An amalgamator for " flour gold ", having, in combination, a stationary trough formed with a plain surfaced bottom through which the auriferous matter is washed by a flow of water, a drum having an amalgamated surface arranged within and across the trough, the periphery of the drum being maintained slightly separated from the bottom of the trough to present its surface tangentially to the surface of the water, and means for rotating the drum so that the portion of the periphery thereof in contact with the water will move at the same speed and in the same direction as the flow of water.

3. An amalgamator for " flour gold ", having, in combination, a stationary trough formed with a plain surfaced bottom through which the auriferous matter is washed by a flow of water, a drum having an amalgamated surface arranged within and across the trough, the periphery of the drum being maintained slightly separated from the bottom of the trough to present its surface tangentially to the surface of the water, and means for adjusting the drum toward and away from the bottom of the trough whereby the surface of the drum may be always presented tangentially to the surface of the water.

4. An amalgamator for " flour gold ", having, in combination, a stationary trough formed with a plain surfaced bottom through which the auriferous matter is washed by a flow of water, a drum having an amalgamated surface arranged within and across the trough, the periphery of the drum being maintained slightly separated from the bottom of the trough to present its surface tangentially to the surface of the water, and means located at the ends of the drum to deflect the matter carried by the water from the space between the drum ends and walls of the trough.

5. An amalgamator for " flour gold ", having, in combination, an elongated stationary trough or sluice formed with a plain surfaced bottom through which the auriferous matter is washed by a flow of water, a plurality of drums having amalgamated surfaces arranged across the trough, the peripheries of the drums being maintained slightly separated from the bottom of the trough to present their surfaces tangentially to the surface of the water.

6. An amalgamator for " flour gold ", having, in combination, a stationary trough or sluice, a plain surfaced amalgamated metallic plate forming the bottom of the trough or sluice, and a series of drums having amalgamated surfaces arranged within and across the trough, the peripheries of the drums being maintained slightly separated from the metallic plate to present their surfaces tangentially to the surface of the water passing over the plate.

7. An amalgamator, having, in combination, a trough, plates within the trough for amalgamating gold, a trap for tailings at the discharge end of the trough, and means for discharging water at a point substantially in the plane of the floor of the trap and below the surface of the materials therein to cause the water to rise through and agitate the entire depth of said materials, substantially as described.

8. An amalgamator, having, in combination, a trough, means within the trough for amalgamating gold, a trap at the discharge end of the trough, a water pipe above the materials in the trap, a series of discharge nozzles depending from the pipe to a point substantially in the plane of the floor of the trap, and means for reciprocating said nozzles to agitate the materials over the whole area of the floor and throughout their entire depth, substantially as described.

9. An amalgamator, having, in combination, a trough suitably provided with mercury for amalgamating gold, a trap for receiving the tailings and any mercury carried out of the trough, and means for washing and agitating the tailings comprising a water conduit in the trap provided with discharge openings said conduit extending into the mercury therein but to an extent to submerge only that portion in which the discharge openings are located, substantially as described.

10. An amalgamator, having, in combination, a stationary trough or sluice, an amalgamated, metallic plate in the bottom of the trough or sluice, a series of drums having amalgamated surfaces above the plate the peripheries of the drums being maintained slightly separated from the plate to present their surfaces tangentially with the surface of the materials passing over the plate, and mechanical means to rotate said drums continuously in the direction of movement of the materials, substantially as described.

11. An amalgamator, having, in combination, a trough to receive the auriferous matter, means within the trough for amalgamating gold, a weir at the discharge end of the trough against which mercury and tailings are delivered, and means for washing and agitating the materials at the weir comprising a water conduit above the mercury adjacent the weir but having its outlet beneath the surface of the mercury, substantially as described.

12. An amalgamator, having, in combination, amalgamating means, a receptacle having a weir at its end against which mercury and tailings are delivered, means for preserving the mercury at the weir by agitating the tailings and preventing their caking against the weir comprising a depending water conduit extending downward through the tailings and provided with a discharge opening submerged in the mercury, and means for reciprocating said conduit, substantially as described.

JOSEPH H. McNEIL.

Witnesses:
WARREN G. OGDEN,
FRED O. FISH.